(12) United States Patent
Choi et al.

(10) Patent No.: US 6,880,362 B2
(45) Date of Patent: Apr. 19, 2005

(54) REFRIGERATING CYCLE APPARATUS

(75) Inventors: Gum Bae Choi, Kariya (JP); Masayuki Takeuchi, Nukata-gun (JP); Yoshitaka Tomatsu, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/874,113

(22) Filed: Jun. 22, 2004

(65) Prior Publication Data

US 2004/0255613 A1 Dec. 23, 2004

(30) Foreign Application Priority Data

Jun. 23, 2003 (JP) ........................................ 2003-178601

(51) Int. Cl.⁷ ................................................ F25B 1/06
(52) U.S. Cl. ............................ 62/500; 62/116; 62/509
(58) Field of Search ............................ 62/116, 191, 490, 62/500, 509, 511, 512

(56) References Cited

U.S. PATENT DOCUMENTS

| | | | |
|---|---|---|---|
| 5,343,711 A | * | 9/1994 | Kornhauser et al. .......... 62/116 |
| 6,438,993 B1 | * | 8/2002 | Takeuchi et al. .............. 62/500 |
| 6,584,794 B1 | * | 7/2003 | Takeuchi et al. .............. 62/278 |
| 2004/0040340 A1 | * | 3/2004 | Takeuchi et al. .............. 62/500 |

FOREIGN PATENT DOCUMENTS

| | | |
|---|---|---|
| JP | 5-312421 | 11/1993 |
| JP | 11-037577 | 2/1999 |

* cited by examiner

*Primary Examiner*—Melvin Jones
(74) *Attorney, Agent, or Firm*—Harness, Dickey & Pierce, PLC

(57) ABSTRACT

In a refrigerating cycle, a heat radiation of a gas cooler is reduced by a heat radiation reduction member when one of a pressure and a temperature of a high pressure side refrigerant is equal to or less than a predetermined value. When a discharge pressure of the refrigerant discharged from a compressor is equal to or lower than the predetermined level, the heat radiation of the gas cooler is reduced by the heat radiation reduction member. Thus, the refrigerant pressure of the high pressure side is increased while the refrigerant pressure of a low pressure side is decreased. With this, a flow rate at a high pressure inlet of an ejector is increased. Also, a flow rate at a low pressure inlet of the ejector is increased. Accordingly, a temperature of air blown from an evaporator is decreased without frosting the evaporator even when a load of the cycle is low.

11 Claims, 7 Drawing Sheets

REFRIGERATING CYCLE APPARATUS

CROSS REFERENCE TO RELATED APPLICATION

This application is based on Japanese Patent Application No. 2003-178601 filed on Jun. 23, 2003, the disclosure of which is incorporated herein by reference.

FIELD OF THE INVENTION

The present invention relates to a refrigerating cycle apparatus having an ejector.

BACKGROUND OF THE INVENTION

In an ejector cycle, a compressor 101, a refrigerant radiator 102, an ejector 103 and a gas-liquid separator 104 are connected in a circuit through refrigerant pipes, as shown in FIG. 9. Also, a pressure-reducing device 105 such as a fixed throttle and a refrigerant evaporator 106 are connected between the ejector 103 and the gas-liquid separator 104 through a bypass pipe. A liquid refrigerant separated from a gas refrigerant in the gas-liquid separator 104 is sucked into a low pressure inlet 108 of the ejector 108 through the bypass pipe. This kind of ejector cycle is for example disclosed in Unexamined Japanese Patent Publication No. JP-A-11-37577.

In a vehicle air conditioning apparatus, it is generally required to meet a wide range of load change depending on use conditions such as from a low load condition during a dehumidifying operation in winter to a high load condition during a cooling operation in summer. The ejector 103 has a fixed nozzle 107 and the diameter of an outlet of the nozzle 107 is fixed irrespective to a flow rate of the refrigerant. If the above ejector cycle is employed to the refrigerating cycle of the vehicle air conditioning apparatus, it is difficult to cope with such wide load change by the ejector 103.

To cope with the wide load change in the cycle, it is proposed to use an ejector having a variable nozzle 112 shown in FIG. 10, for example, in Unexamined Japanese Patent Publication No. JP-A-5-312421. In a variable nozzle 112, a diameter of a nozzle outlet is changeable by a needle valve 111 according to the load condition and the flow rate of the refrigerant.

When an outside temperature is low and a flow velocity of cooling air is high, a refrigerant pressure at a high pressure side is lowered in the refrigerating cycle. Furthermore, when a temperature of air supplied to the evaporator is high or the amount of the air is large, that is, when a load of the refrigerant evaporator is high, a refrigerant pressure at a low pressure side is increased. As a result, a pressure difference between the high pressure side and the low pressure side is decreased. In the vehicle air conditioning apparatus, for example, the above circumstance is likely to occur when an inside air is circulated while an outside air temperature is low.

Incidentally, in a refrigerating cycle having an expansion valve, even under the above circumstance, the refrigerant pressure at the high pressure side is increased and the refrigerant pressure at the low pressure side is decreased by reducing the diameter of the expansion valve, as shown in FIG. 11. By this, a refrigerant flow rate is maintained at or increased to an optimal rate. Accordingly, air can be blown from the evaporator with a predetermined desired temperature.

On the other hand, in the ejector cycle, the refrigerant is sucked into the low pressure inlet of the ejector from the evaporator by using a loss energy produced while decompressing the refrigerant at a nozzle portion of the ejector. By this, a flow rate of the refrigerant passing through the evaporator is maintained. When the pressure difference between the high pressure side and the low pressure side is decreased under the above circumstance, a flow rate of the refrigerant is decreased at a high pressure inlet of the ejector through which a high pressure refrigerant is introduced in the ejector. As a result, the loss energy used to suck the refrigerant from the evaporator is insufficient. Therefore, it is difficult to facilitate the flow of refrigerant in the evaporator. As a result, the temperature of air blown from the evaporator is increased.

Furthermore, if the refrigerant pressure in the low pressure side is reduced while the refrigerant pressure in the high pressure side is not increased as shown in FIG. 12, the refrigerant evaporator is likely to be frosted. For example in the dehumidifying heating operation, it is difficult to produce air at a predetermined temperature (for example, 3 degree Celsius) from the evaporator.

SUMMARY OF THE INVENTION

The present invention is made in view of the foregoing matters, and it is an object of the present invention to provide a refrigerating cycle having an ejector, capable of restricting performance deterioration of the cycle due to shortage of a refrigerant flow rate during a low load condition.

According to the present invention, a refrigerating cycle includes a gas-liquid separator, a compressor, a refrigerant radiator, a refrigerant evaporator, an ejector, and a throttle device. The gas-liquid separator separates a refrigerant into a gas refrigerant and a liquid refrigerant. The compressor is disposed to communicate with a gas refrigerant outlet of the gas-liquid separator. The compressor compresses the gas refrigerant and produces a high pressure, high temperature refrigerant. The refrigerant radiator is disposed downstream of the compressor. The refrigerant radiates heat of the high pressure, high temperature refrigerant. The refrigerant evaporator is disposed to communicate with a liquid refrigerant outlet of the gas-liquid separator. The refrigerant evaporator evaporates a low pressure, low temperature liquid refrigerant discharged from the gas-liquid separator. The ejector has a high pressure inlet communicating with a refrigerant outlet of the refrigerant radiator, a low pressure inlet communicating with a refrigerant outlet of the refrigerant evaporator, a nozzle portion through which the refrigerant passed through the high pressure inlet is sprayed. The refrigerant is sucked to the low pressure inlet from the refrigerant evaporator by using a pressure decrease around the refrigerant sprayed at the nozzle portion and mixed with the sprayed refrigerant. The refrigerant is discharged toward the gas-liquid separator after its pressure is increased by mixing. The throttle device is provided to control a pressure of the high pressure refrigerant. Further, the cycle includes a discharge pressure detecting device for detecting a pressure of the refrigerant discharged from the compressor and a heat radiation reduction member for reducing heat radiation of the refrigerant radiator according to the pressure detected by the discharge pressure detecting device.

When the detected discharge pressure is equal to or less than a predetermined pressure, a heat radiation of the refrigerant radiator is reduced by the heat radiation reduction member. By this, the pressure at the high pressure side is increased while the pressure at the low pressure side is decreased. Further, a flow rate of the refrigerant at the high pressure inlet side of the ejector is increased, so a flow rate of the refrigerant at the low pressure inlet side of the ejector is sufficiently maintained. With this, since the sufficient flow rate is maintained, a performance of the cycle is not deteriorated. Further, air is blown from the evaporator at a desired temperature without frosting the evaporator.

Alternatively, the heat radiation of the refrigerant radiator is reduced by the heat radiation reduction member according to a temperature of the refrigerant. For example, the temperature of the refrigerant is detected by a temperature sensor at an outlet side of the refrigerant radiator.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
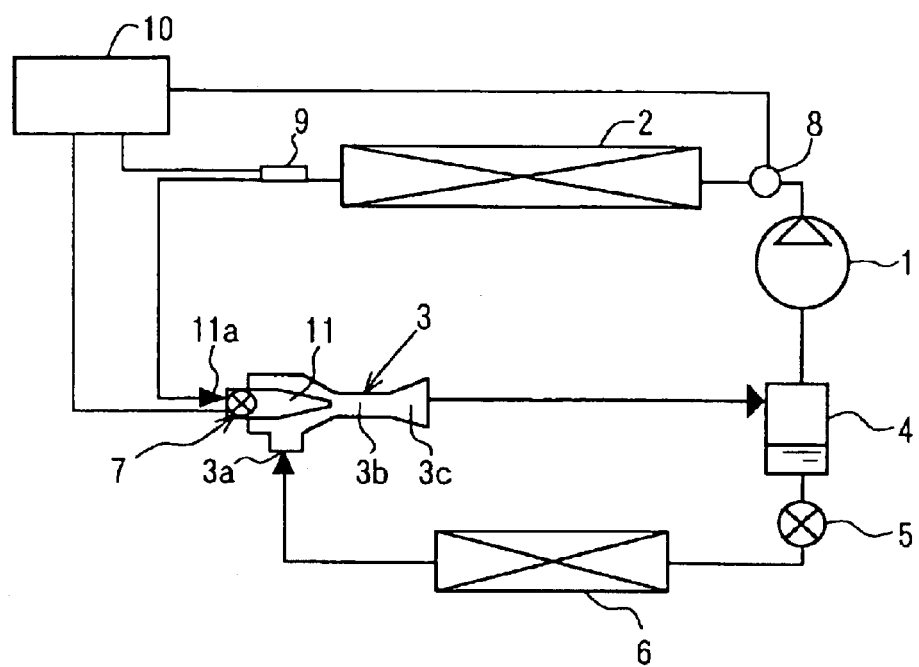
FIG. 1 is a schematic circuit diagram of a refrigerant cycle according to a first embodiment of the present invention.

Embodiments of the present invention will be described hereinafter with reference to the drawing.

First Embodiment

Referring to FIG. 1, a refrigerating cycle of the present invention is for example employed to an air conditioning apparatus for a vehicle. The refrigerating cycle is an ejector cycle in which a refrigerant compressor 1, a gas cooler (refrigerant radiator) 2, an ejector 3 and a gas-liquid separator 4 are connected in a loop through refrigerant pipes. The ejector cycle further includes a pressure-reducing device 5 and a refrigerant evaporator 6. A liquid refrigerant outlet of the gas-liquid separator 4 and a low-pressure inlet 3a of the ejector 3 are connected to each other through a bypass pipe. The pressure-reducing device 5 and the refrigerant evaporator 6 are provided on the bypass pipe.

In the cycle, carbon dioxide ($CO_2$), which has a low critical temperature, is used as a refrigerant, for example.

The ejector cycle constructs a super critical vapor compression-type ejector cycle in which the refrigerant is compressed in the compressor 1 so that pressure of the refrigerant is equal to or higher than a super critical pressure at a high pressure side. Furthermore, in the cycle, temperature of the refrigerant discharged from the compressor 1 is increased up to approximately 150 degrees Celsius with an increase in the refrigerant pressure at the high pressure side. That is, temperature of the refrigerant at a refrigerant inlet of the gas cooler 2 is increased up to approximately 150 degrees Celsius. Since the pressure of the refrigerant is equal to or higher than the super critical pressure, the refrigerant is not condensed and liquefied in the gas cooler 2 even if it radiates heat in the gas cooler 2.

The compressor 1 is driven by an engine (not shown) mounted in an engine compartment of a vehicle or another driving source such as an electric motor (not shown). The compressor 1 draws a gas refrigerant from a gas refrigerant outlet of the gas-liquid separator 4 and compresses the gas refrigerant therein so that the refrigerant has a pressure equal to or higher than the super critical pressure. Further, the compressor 1 discharges the high temperature, high pressure refrigerant toward the gas cooler 2.

The gas cooler 2 is arranged in the engine compartment at a position easily receiving airflow. The gas cooler 2 performs heat exchange between the refrigerant discharged from the compressor 1 and outside air introduced by a blower (not shown) from an outside of a passenger compartment. Thus, the heat of the refrigerant is radiated through the gas cooler 2.

The ejector 3 has a high pressure inlet portion 11a, the low pressure inlet portion 3a, a nozzle 11, a mixing portion 3b and a diffuser portion 3c. In the ejector 3, the refrigerant flowed through the high pressure refrigerant 11a is sprayed out from the nozzle 11 at a high speed. At this time, the refrigerant in the bypass pipe is sucked through the low pressure inlet 3a in accordance with the pressure decrease around the refrigerant sprayed out through the nozzle 11.

The refrigerant sprayed from the nozzle 11 and the refrigerant sucked through the low pressure inlet portion 3a are mixed to each other in the mixing portion 3b. The mixed refrigerant is diffused in the diffuser portion 3c and its pressure is increased. Then, the refrigerant is discharged from a discharging port (ejector outlet) of the ejector 3, and is introduced toward the gas-liquid separator 4.

The ejector 3 of the embodiment is integrally provided with a variable throttle mechanism (variable throttle means) 7. A diameter or a dimension of the throttle, that is, a nozzle outlet diameter, is changeable in accordance with load change of the cycle.

The gas-liquid separator 4 is an accumulator for separating the refrigerant discharged from the ejector 3 into the gas refrigerant and a liquid refrigerant. The pressure-reducing device 5 is for example constructed of a fixed throttle including a capillary tube or an orifice, or a thermo-type or electric-type variable throttle. In the pressure-reducing device 5, the liquid refrigerant flowed from the gas-liquid separator 4 is decompressed into a gas and liquid two-phase refrigerant.

The evaporator 6 performs heat exchange between the refrigerant decompressed by the pressure-reducing device 5 and air, thereby evaporating the refrigerant. The air is for example the outside air or an inside air inside the passenger compartment. The air is blown toward the evaporator 6 by a blower (not shown). The gas refrigerant discharged from the evaporator 6 is introduced toward the compressor 1 through the ejector 3.

An ECU (electronic control unit) 10 is provided to control operations of the compressor 1, the blowers, the variable throttle mechanism 7, and the like. The ECU 10 is constructed of such as CPU, ROM, RAM, I/O port. The ECU 10 also includes a microcomputer having a well-known structure.

In the cycle, a discharge pressure sensor (discharge pressure detecting means) 8 is provided downstream of a refrigerant outlet of the compressor 1. A refrigerant temperature sensor (refrigerant temperature detecting means) 9 is provided downstream of the gas cooler 2. The discharge pressure sensor 8 detects a discharge pressure Ph of the refrigerant that is discharged from the compressor 1 and is to be introduced into the gas cooler 2. The refrigerant temperature sensor 9 detects a temperature Tgc of the refrigerant discharging from the outlet of the gas cooler 2. Signals from the discharge pressure sensor 8 and the refrigerant temperature sensor 9 are converted through an input circuit (analog-to-digital converter) and then sent to the microcomputer.

In the ECU 10, load conditions and load change of the cycle are normally determined based on the detected refrigerant pressure Ph and the detected refrigerant temperature Tgc. The ECU 10 sends signals according to the determined load conditions and load change to the variable throttle mechanism 7. The variable throttle mechanism 7 is controlled such that a discharge pressure of the compressor 1 is at an optimum high pressure (Pe).

In the ECU 10, it is determined that the higher the detected refrigerant pressure Ph and the detected refrigerant temperature Tgc are, the higher the load of the cycle is. The throttle diameter of the ejector nozzle 11 is controlled such that the diameter of the throttle 11 of the ejector nozzle 3 (a diameter of an outlet of the nozzle 11) is increased with the increase in the load.

Next, operation of the cycle will be briefly described with reference to FIG. 1. The high temperature, high pressure, gas refrigerant compressed in the compressor 1 is flowed into the gas cooler 2 from an inlet of the gas cooler 2. The refrigerant is cooled by the outside air while passing through the gas cooler 2.

Then, the refrigerant discharged from an outlet of the gas cooler 2 is introduced in the nozzle 11 from the high pressure inlet 11a of the ejector 3 through the variable throttle mechanism 7. The refrigerant is decompressed through the nozzle 11 and sprayed out from the nozzle 11 into the mixing portion 3b. The pressure of the refrigerant is increased while the refrigerant passes through the mixing portion 3b and the diffuser portion 3c.

At this time, the gas refrigerant is sucked in the low pressure inlet 3a from the evaporator 6 by using the pressure decrease around the refrigerant sprayed from the nozzle 11. After the refrigerant sprayed from the nozzle 11 and the refrigerant sucked through the low pressure inlet 3a are effectively mixed in the mixing portion 3b, the mixed refrigerant is diffused in the diffuser portion 3c. Then, the gas-liquid two-phase refrigerant discharged from the diffuser portion 3c is introduced in the gas-liquid separator 4. The refrigerant is separated into the gas refrigerant and the liquid refrigerant in the gas-liquid separator 4. Thereafter, the gas refrigerant is sucked in the compressor 1 from the gas refrigerant outlet of the gas-liquid separator by a suction force of the compressor 1.

On the other hand, the liquid refrigerant accumulated in the gas-liquid separator 4 is discharged from the liquid refrigerant outlet of the gas-liquid separator 4 and flowed in the pressure-reducing device 5 by a suction force of the low pressure inlet 3a of the ejector 3. In the pressure-reducing device 5, the refrigerant is decompressed and becomes the gas-liquid two-phase refrigerant. Then, the refrigerant is flowed in the evaporator 6 through the inlet of the evaporator 6. In the evaporator 6, the refrigerant is evaporated by exchanging heat with the air, which is for example an air flowing in an air conditioning duct of the vehicle air conditioner. Then, the refrigerant is sucked in the low pressure inlet 3a of the ejector 3 and mixed with the refrigerant sprayed from the nozzle 11 in the mixing portion 3b of the ejector 3.

When the load of the refrigerating cycle is high such as in a cooling down mode in summer, an opening degree of the variable throttle mechanism 7 is increased. Thus, a circulation amount of the refrigerant in the refrigerating cycle is increased. On the other hand, when the load of the refrigerating cycle is low such as in a dehumidifying mode in winter, the throttle diameter of the nozzle 11 of the ejector 3 is decreased. Thus, the circulation amount of the refrigerant in the refrigerating cycle is decreased.

Next, structure of the gas cooler 2 will be described in detail with reference to FIG. 2. The gas cooler 2 includes header tanks and a core portion between the header tanks. The core portion includes a plurality of tubes and performs heat exchange between the refrigerant and the air. An inlet pipe of the gas cooler 2 is connected to a tank portion 21 of the header tank. The refrigerant discharged from the compressor 1 flows in the first header tank portion 21 through the inlet pipe. In the gas cooler 2, the refrigerant flows through the first header tank portion 21, a first core portion 2a, a second header tank portion 22, a second core portion 2b, a third header tank portion 23, a third core portion 2c, a fourth header tank portion 24, a fifth core portion 2d, a fifth header tank portion 25 in this order while making turns in the header tank portions 22, 23, 24. The cooled refrigerant is discharged from an outlet formed in the fifth header tank portion 25 toward the ejector 3. Hereafter, the above refrigerant path/flow is referred to as a normal refrigerant path.

Further, the gas cooler 2 is provided with a heat radiation reduction member (heat radiation reduction means) to reduce heat radiation of the gas cooler 2 according to load condition of the cycle. The heat radiation reduction member includes a bypass passage B1 and a switching valve (valve means) 14 for controlling a flow of the refrigerant to the bypass passage B1. The bypass passage B1 is provided at an upstream position of the gas cooler 2 so that the refrigerant bypasses a part of the gas cooler 2.

When the detected discharge pressure Ph is equal to or less than a predetermined pressure P1, or when the detected refrigerant temperature Tgc is equal to or less than a predetermined temperature T1, the switching valve 14 is controlled to open the bypass passage B1 by the ECU 10. Thus, the gas refrigerant is partly allowed to flow through the bypass passage B1, thereby bypassing the part of the gas cooler 2.

Figure 2:
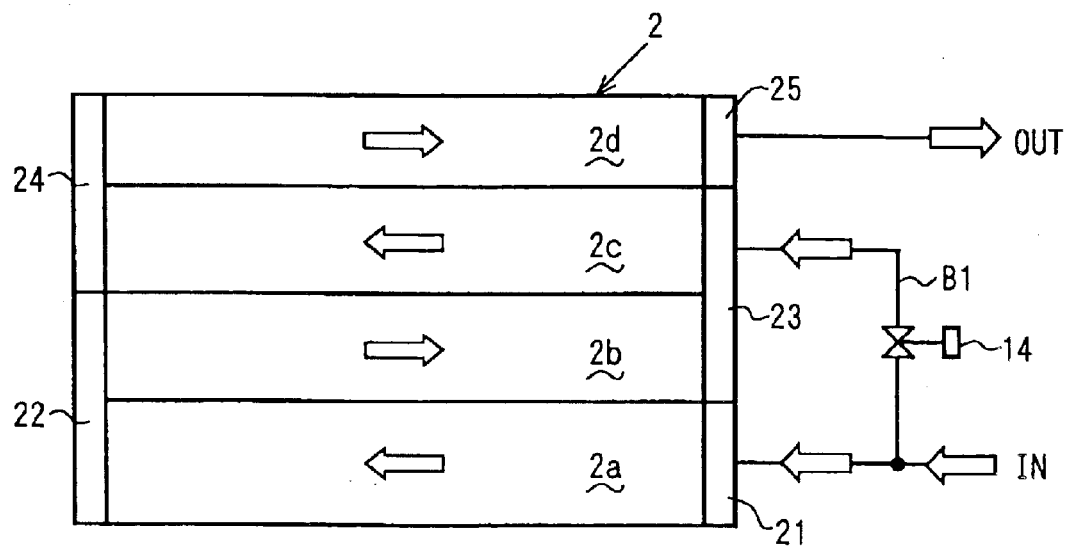
FIG. 2 is a schematic view of a gas cooler having a heat radiation reduction member according to the first embodiment of the present invention.

In the example shown in FIG. 2, when the switching valve 14 is opened, the part of the refrigerant, which flows through the bypass passage B1, flows in the third header tank portion 23, while bypassing the first and second core portions 2a, 2b. The refrigerant further flows in the third core portion 2c, the fourth header tank portion 24, the fourth core portion 2d, and the fifth header tank portion 25. The remaining refrigerant flows through the gas cooler 2 from the first header tank portion 21 to the fifth header tank portion 25 through the normal refrigerant path.

In the first embodiment, the bypass passage B1 and the valve device 14 are provided as the heat radiation reduction means. The valve device 14 is controlled to open the bypass passage B1 when the detected discharge pressure Ph is equal to or less than the predetermined pressure P1 or when the detected refrigerant temperature Tgc is equal to or less than the predetermined temperature T1.

Figure 3:
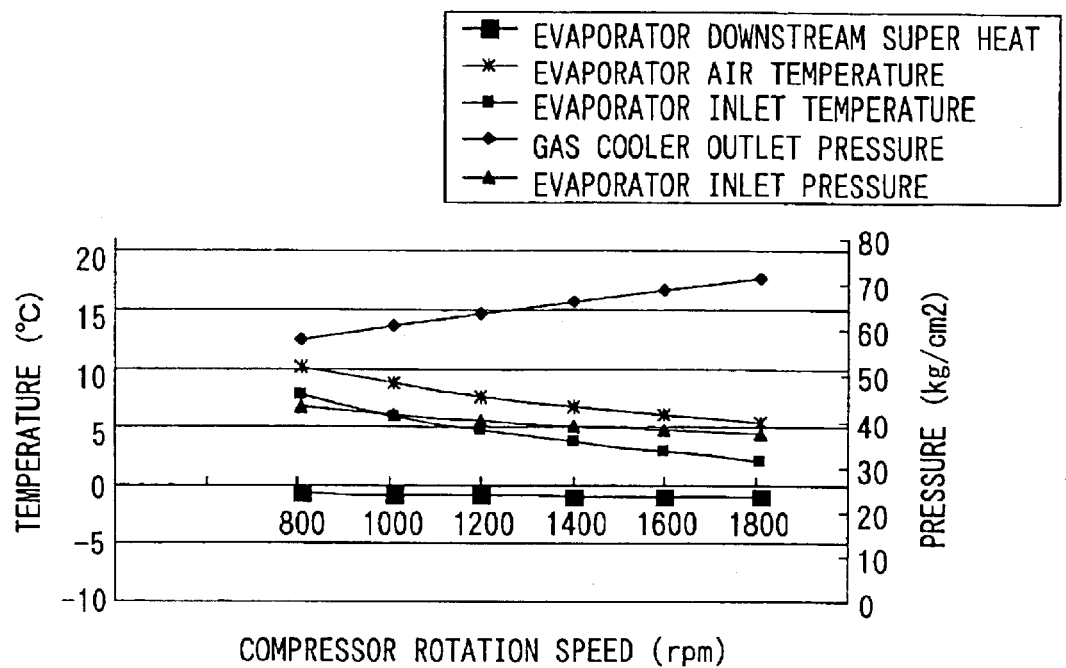
FIG. 3 is a graph showing a relationship between a rotation speed of a compressor and a temperature of air blown from an evaporator according to the first embodiment of the present invention.

By controlling the refrigerant flow to the bypass passage B1 by the valve device 14, heat radiation of the gas cooler 2 is reduced. As shown in FIG. 3, when the heat radiation is reduced, the pressure at the high pressure side (gas cooler outlet side pressure) is increased while the pressure at the low pressure side (evaporator inlet side pressure) is decreased.

Because the energy, which is produced during the decompression at the nozzle 11 of the ejector 3, is maintained or collected for some amount, the flow rate at the driving side, that is, the high pressure inlet side 11a is increased. Also, the flow rate of the refrigerant at the suction side of the ejector 3, that is, the low pressure inlet side 3a, is sufficiently maintained. Accordingly, the temperature of air blown from the evaporator 6 is decreased without frosting the evaporator 6.

Second Embodiment

Figure 4:
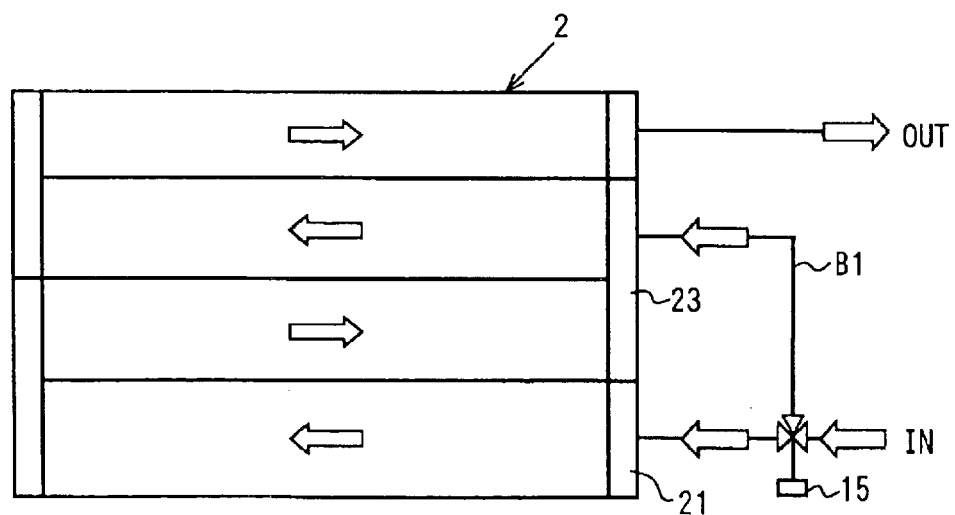
FIG. 4 is a schematic view of a gas cooler according to a second embodiment of the present invention.

In the second embodiment, the heat radiation reduction member of the gas cooler 2 has a three-way valve or a flow rate distribution valve 15, in place of the switching valve 14 of the first embodiment, as shown in FIG. 4. The valve 15 switches the refrigerant flow between the normal path and the bypass passage B1. BY the valve 15, one of the normal path, the bypass passage B1, and both the bypass passage B1 and the normal path is selected for the refrigerant passage, depending on the load condition of the cycle. When the refrigerant is introduced into both the normal path and the bypass passage B1, the flow rates or distribution rates of the refrigerant to the normal path and the bypass passage B1 are adjusted by the valve 15.

Third Embodiment

Figure 5:
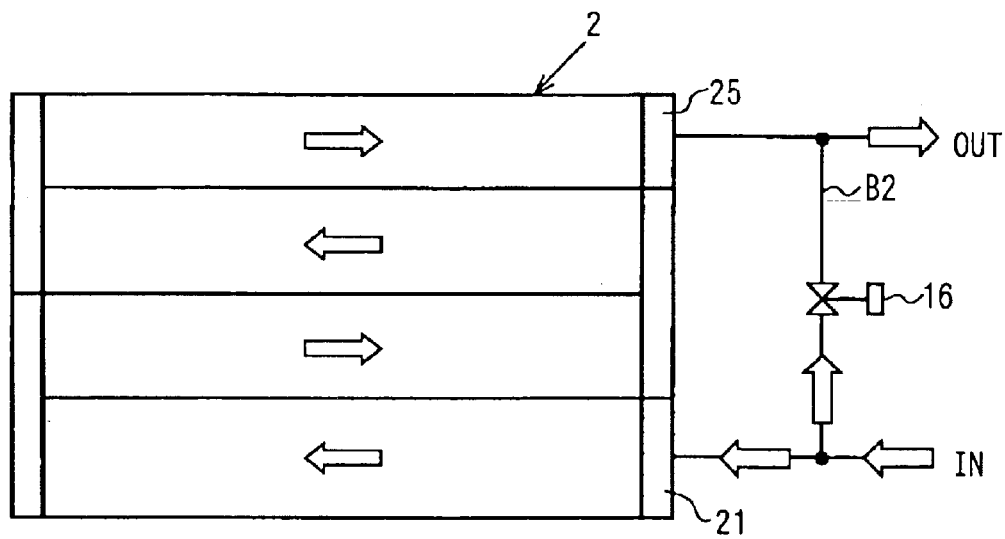
FIG. 5 is a schematic view of a gas cooler having a heat radiation reduction member according to a third embodiment of the present invention.

In the third embodiment, as shown in FIG. 5, the heat radiation reduction member of the gas cooler 2 includes a bypass passage B2 and a flow rate control valve 16. The bypass passage B2 is provided to connect between the inlet pipe and the outlet pipe of the gas cooler 2. The flow rate control valve 16 is provided in the bypass passage B2 for switching the refrigerant passage between the normal path and the bypass passage B2. The flow of the refrigerant is switched between the normal path in which the refrigerant flows in the gas cooler 2 through the normal path and a two way mode in which the refrigerant flows through both the normal path and the bypass passage B2. In the two way mode, the flow rates or distribution rates of the refrigerant to the respective paths are controlled by the flow rate control valve 16.

Fourth Embodiment

Figure 6:
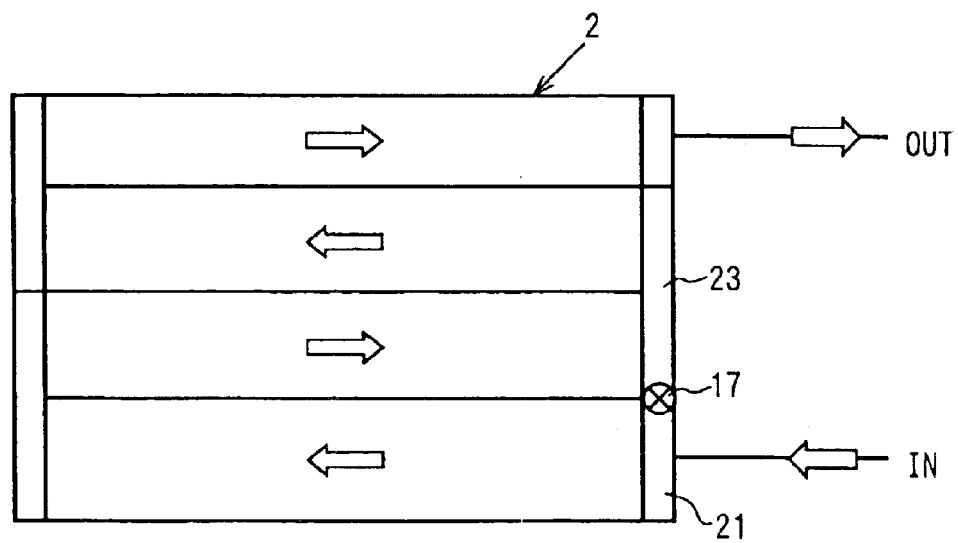
FIG. 6 is a schematic view of a gas cooler having a heat radiation reduction member according to a fourth embodiment of the present invention.

In the fourth embodiment, as shown in FIG. 6, the heat radiation reduction member includes a thermo valve 17 and a bypass passage B3. The thermo valve 17 is installed between the first header tank portion 21 and the third header tank portion 23. The bypass passage B3 is formed in the thermo valve 17 and is opened and closed by the thermo valve 17. When the temperature of the refrigerant flowing around the thermo valve 17 is equal to or less than the predetermined temperature T1, the thermo valve 17 opens the bypass passage B3.

Figure 7B:
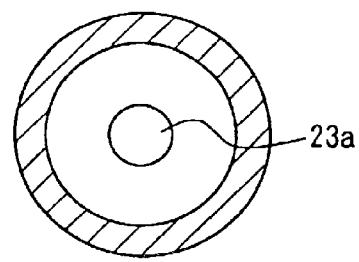
FIG. 7B is a cross-sectional view of the thermo valve shown in FIG. 7A, for showing an outlet port, according to the fourth embodiment of the present invention.
Figure 7A:
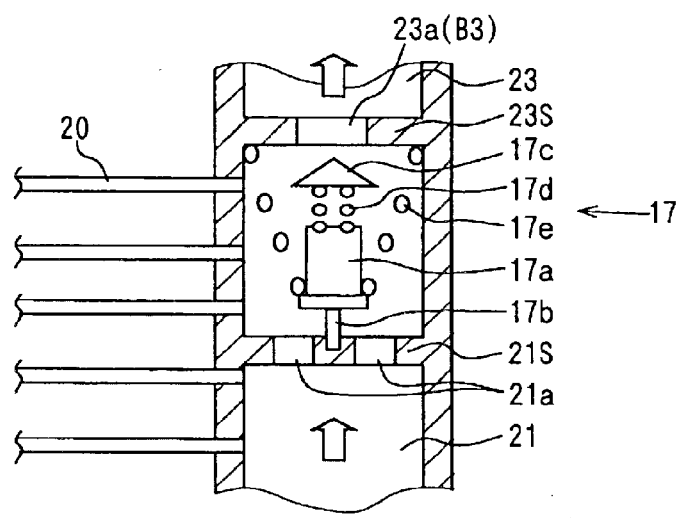
FIG. 7A is a longitudinal cross-sectional view of a thermo valve of the heat radiation reduction member according to a fourth embodiment of the present invention.
Figure 7C:
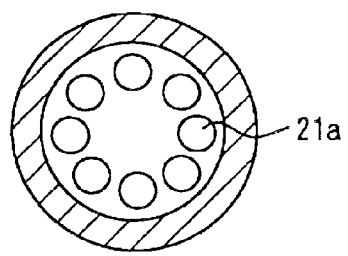
FIG. 7C is a cross-sectional view of the thermo valve shown in FIG. 7A, for showing inlet ports, according to the fourth embodiment of the present invention.

Specifically, as shown in FIGS. 7A to 7C, the thermo valve 17 is provided at a boundary between the first header tank portion 21 and the third header tank portion 23. An outlet port 23a is formed on a first separation wall 23s. The outlet port 23a defines the bypass passage B3. Also, inlet ports 21a are formed on a second separation wall 21s. The thermo valve 17 is constructed of a body portion (thermo element portion) 17a, an operation shaft 17b, a valve portion 17c, a first spring 17d, and a second spring 17e. The operation shaft 17b is fixed to the second separation wall 21s at its end so that the body portion 17a is held. The valve portion 17c is located at an end of the body portion 17a adjacent to the bypass passage B3 through the spring 17d on a side opposite to the operation shaft 17b.

The first spring 17d absorbs a tolerance of the dimension of the first spring 17d itself and protects the valve portion 17c when the valve portion 17c closes the bypass passage B3. Further, the second spring 17e is disposed to hold an outer periphery of the body portion 17a. The second spring 17e is provided to return the valve portion 17c to an original position.

Inside of the body portion 17a is filled with a temperature sensitive member such as a thermo wax or an inert gas. The temperature sensitive member is expanded or constricted according to the temperature of the refrigerant flowing around the body portion 17a, thereby moving the operation shaft 17b. By the reaction of the operation shaft 17b, the body portion 17a itself is moved, so the valve 17c is moved to open or close the bypass passage B3.

When the temperature of the refrigerant flowing through the inlet ports 21a is higher than the predetermined temperature, the operation shaft 17b extends to move the valve portion 17c so that the bypass passage B3 is covered. Thus, the refrigerant in the thermo valve 17 is distributed into the tubes 20 of the core. On the other hand, when the temperature of the refrigerant is equal to or lower than the predetermined temperature, the operation shaft 17b is constricted, so the valve portion 17c separates from the first separation wall 23c to open the bypass passage B3. Thus, the refrigerant partly flows in the third header tank portion 23 through the bypass passage B3. Accordingly, in the fourth embodiment, the valve 17 is not controlled by the ECU 10.

Fifth Embodiment

Figure 8A:
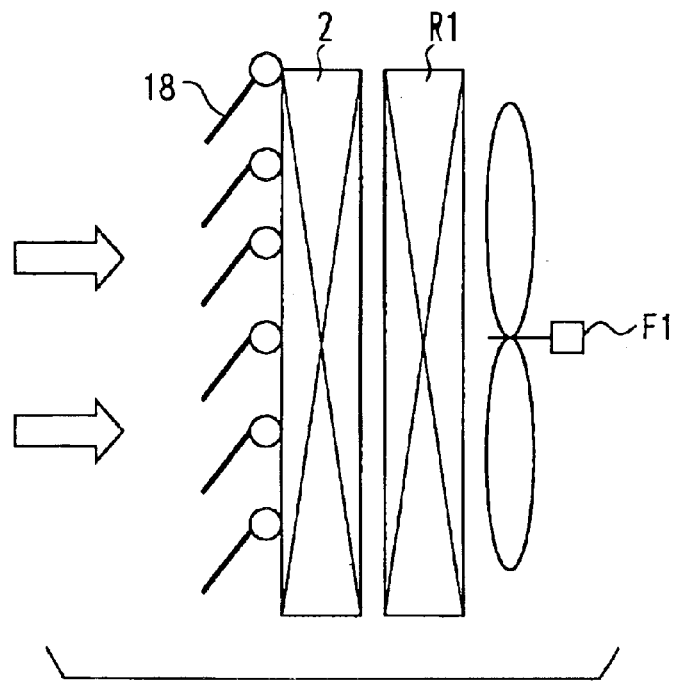
FIGS. 8A and 8B is a side view of a gas cooler having a shutter according to a fifth embodiment of the present invention.
Figure 8B:
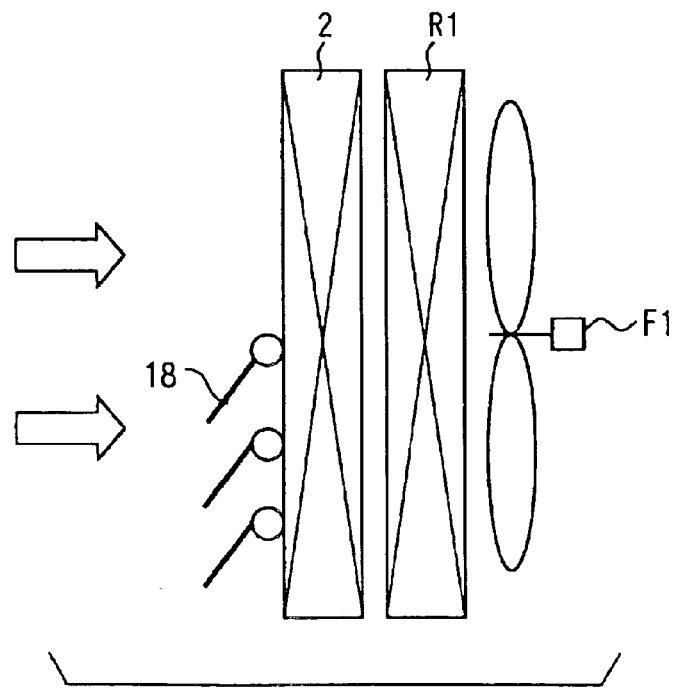
Figure 9:
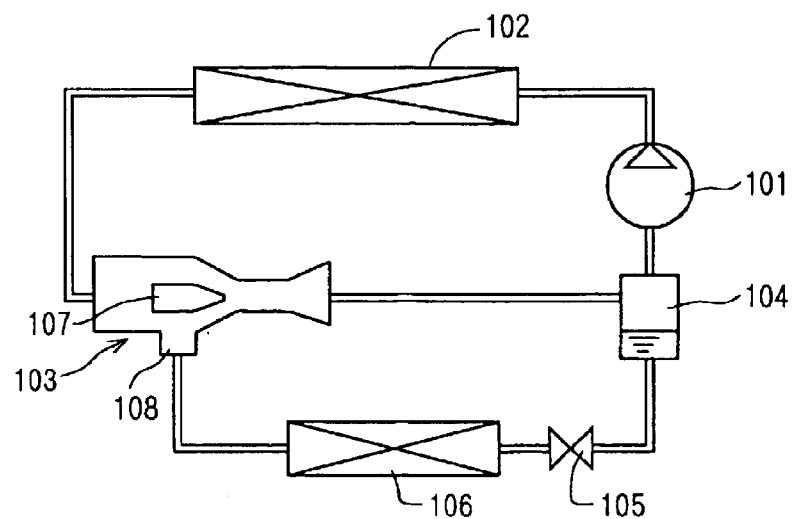
FIG. 9 is a schematic circuit diagram of a refrigerating cycle of a prior art.
Figure 10:
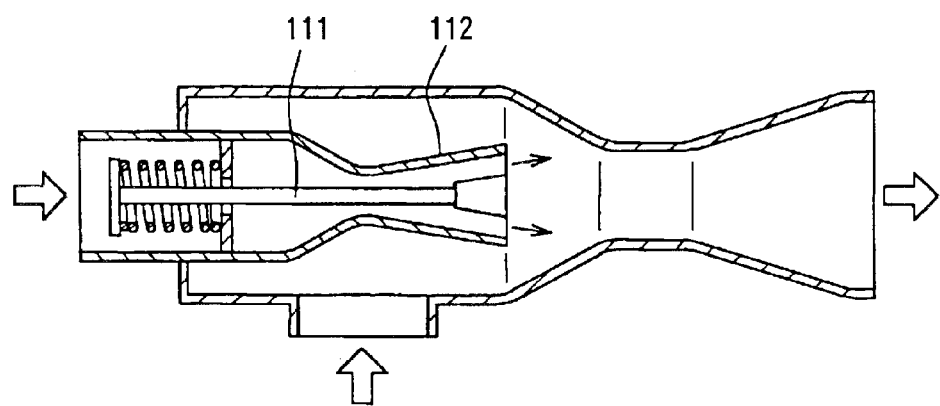
FIG. 10 is a cross-sectional view of an ejector having a variable nozzle of a prior art.
Figure 11:
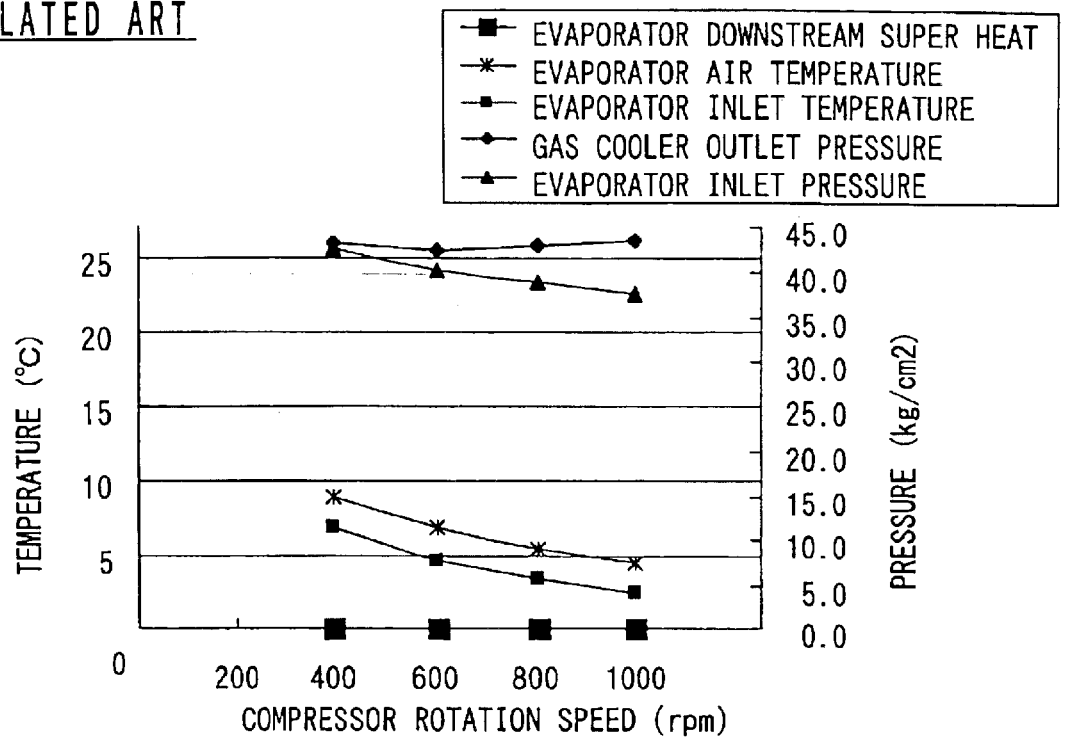
FIG. 11 is a graph of a refrigerating cycle having an expansion valve of a related art.
Figure 12:
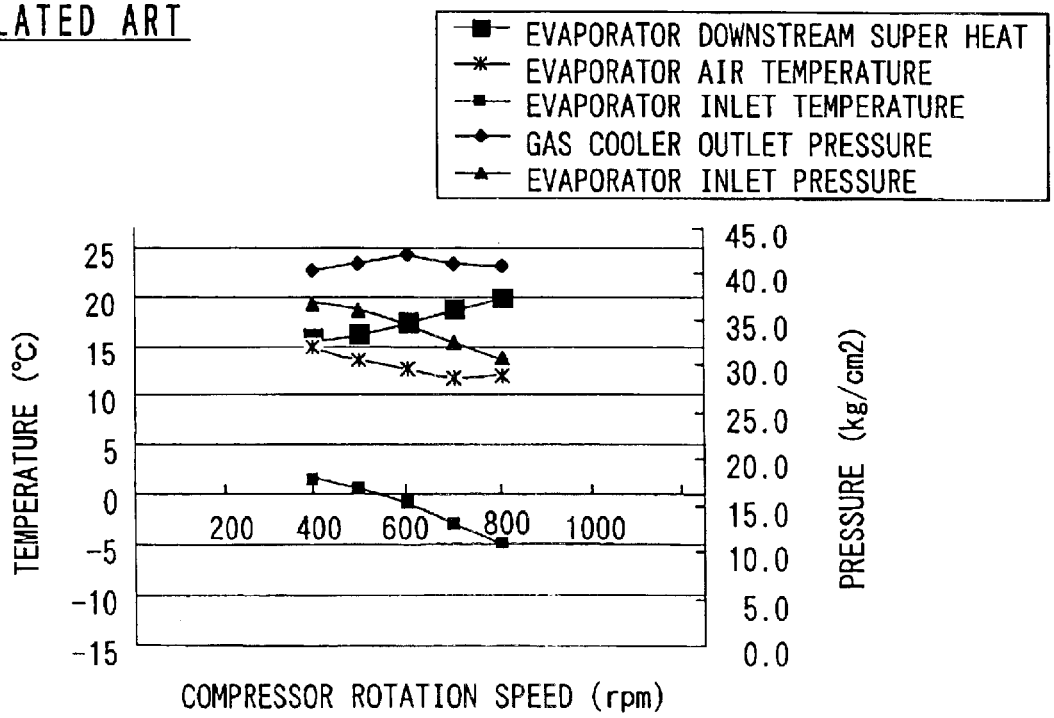
FIG. 12 is a graph of a refrigerating cycle having an ejector of a related art.

As shown in FIGS. 8A and 8B, the gas cooler 2 is arranged upstream of a radiator R1 for cooling an engine cooling water with respect to a flow direction of air (arrows in FIGS. 8A and 8B). An electric fan F1 is arranged downstream of the radiator R1. In the fifth embodiment, as the heat radiation reduction member, a shutter (air amount control mechanism) 18 is provided to partly or entirely cover a core surface of the gas cooler 2.

In FIG. 8A, the shutter 18 is provided to entirely cover the core surface of the gas cooler 2. In FIG. 18B, the shutter 18 is provided to cover a substantially lower half of the core surface of the gas cooler 2. The shutter 18 is closed when the discharge pressure Ph is equal to or less than the predetermined pressure P1 or when the refrigerant temperature Tgc is equal to or less than the predetermined temperature T1. Alternately, the opening degree of the shutter 18 is controlled according to the discharge pressure Ph and the refrigerant temperature Tgc. By this, because the amount of air passing through the core portion of the gas cooler 2 is controlled, the heat exchanging rate of the gas cooler 2 is controlled. Accordingly, the heat radiation of the gas cooler 2 is reduced by the shutter 18.

Other Embodiments

The present invention is not limited to the refrigerating cycle in which carbon dioxide is used as the refrigerant in the super critical state. The present invention is for example employed to a refrigerating cycle using flon or another substance as the refrigerant. Also, the refrigerating cycle is not limited for use in the vehicle air conditioning apparatus. The refrigerating cycle can be employed to such as refrigerator, freezer, heating apparatus, or a refrigerating cycle for another purpose. If a control response result is hunched or oscillated, a second predetermined pressure P2 and a second predetermined temperature T2 can be set. The refrigerant flow is switched back to the normal path based on the second predetermined pressure P2 or the second predetermined temperature T2.

The present invention is not limited to the above embodiments, but may be implemented in other ways without departing from the spirit of the invention.

What is claimed is:

1. A refrigerating cycle apparatus comprising:
   a gas-liquid separator in which a refrigerant is separated into a gas refrigerant and a liquid refrigerant, the gas-liquid separator has a gas refrigerant outlet and a liquid refrigerant outlet;
   a compressor disposed to communicate with the gas refrigerant outlet of the gas-liquid separator, the compressor compresses the refrigerant sucked from the gas-liquid separator and discharges a high temperature, high pressure refrigerant;
   a refrigerant radiator disposed downstream of the compressor, the refrigerant radiator radiates heat of the high temperature, high pressure refrigerant discharged from the compressor;
   a refrigerant evaporator disposed to communicate with the liquid refrigerant outlet of the gas-liquid separator, the refrigerant evaporator evaporates the refrigerant;
   an ejector disposed between the refrigerant radiator and the gas-liquid separator, the ejector having a high pressure refrigerant inlet portion communicating with the refrigerant radiator and a low pressure refrigerant inlet portion communicating with the refrigerant evaporator;
   a throttle device provided at a high pressure side of the ejector to control a pressure of the high pressure refrigerant;
   a discharge pressure sensor provided downstream of the compressor for detecting a pressure of the refrigerant discharged from the compressor; and
   a heat radiation reduction member provided to reduce heat radiation of the refrigerant radiator when a detected pressure of the refrigerant is equal to or less than a predetermined pressure.

2. The refrigerating cycle apparatus according to claim 1, wherein
   the heat radiation reduction member includes a bypass passage provided so that the refrigerant bypasses at least a part of the refrigerant radiator and a valve provided to control a flow of the refrigerant to the bypass passage.

3. The refrigerating cycle apparatus according to claim 1, wherein
   the refrigerant radiator includes a core portion in which heat exchange is performed between air and the refrigerant and a header tank communicating with the core portion,
   the heat radiation reduction member includes an air amount control mechanism that controls an amount of air supplied to the core portion, and
   the air amount control mechanism is disposed to cover at least a part of a core surface of the core portion.

4. The refrigerating cycle apparatus according to claim 1, further comprising:
   a control device that controls the heat radiation reduction member.

5. The refrigerating cycle apparatus according to claim 1, further comprising:
   a temperature sensor provided to detect a temperature of the refrigerant discharged from the refrigerant radiator.

6. A refrigerating cycle apparatus comprising:
   a gas-liquid separator in which a refrigerant is separated into a gas refrigerant and a liquid refrigerant, the gas-liquid separator includes a gas refrigerant outlet and a liquid refrigerant outlet;
   a compressor disposed to communicate with the gas refrigerant outlet of the gas-liquid separator, the compressor compresses the refrigerant sucked from the gas-liquid separator and discharges a high temperature, high pressure refrigerant;
   a refrigerant radiator disposed downstream of the compressor, the refrigerant radiator radiates heat of the high temperature, high pressure refrigerant discharged from the compressor;
   a refrigerant evaporator disposed to communicate with the liquid refrigerant outlet of the gas-liquid separator, the evaporator evaporates the refrigerant;
   an ejector disposed between the refrigerant radiator and the gas-liquid separator, the ejector having a high pressure refrigerant inlet portion communicating with the refrigerant radiator, a low pressure refrigerant inlet portion communicating with the refrigerant evaporator;
   a throttle device provided at a high pressure side of the ejector to control a pressure of the high pressure refrigerant; and
   a heat radiation reduction member provided to reduce heat radiation of the refrigerant radiator according to a temperature of the refrigerant.

7. The refrigerating cycle apparatus according to claim 6, further comprising:
   a temperature sensor provided to detect a temperature of the refrigerant discharged from the refrigerant radiator; and
   a control device disposed to control the heat radiation reduction member so that the heat radiation of the refrigerant radiator is reduced when a detected temperature is equal to or less than a predetermined temperature.

8. The refrigerating cycle apparatus according to claim 6, wherein
   the heat radiation reduction member includes a bypass passage provided so that the refrigerant bypasses at least a part of the refrigerant radiator and a valve disposed to control a flow of the refrigerant to the bypass passage.

9. The refrigerating cycle apparatus according to claim 6, wherein
   the refrigerant radiator includes a core portion in which heat exchange is performed between air and the refrigerant and a header tank communicating with the core portion,
   the heat radiation reduction member includes an air amount control mechanism that controls an amount of air supplied to the core portion, and
   the air amount control mechanism is disposed to cover at least a part of a core surface of the core portion.

10. The refrigerating cycle apparatus according to claim 6, wherein
    the refrigerant radiator includes a core portion in which heat exchange is performed and a header tank communicating with the core portion, the header tank is separated at least into a first tank portion and a second tank portion, the heat radiation reduction member is provided between the first tank portion and the second tank portion, the heat radiation reduction member includes a bypass passage to make communication between the first tank portion and the second tank portion and a thermo valve, and the thermo valve is disposed to allow the refrigerant to flow in the bypass passage when the temperature of the refrigerant flowing around the thermo valve is equal to or less than a predetermined temperature.

11. The refrigerating cycle apparatus according to claim 6, further comprising:

a pressure sensor provided to detect a pressure of the refrigerant discharged from the compressor.

* * * * *